United States Patent
Holtmanns et al.

(10) Patent No.: US 8,875,236 B2
(45) Date of Patent: Oct. 28, 2014

(54) SECURITY IN COMMUNICATION NETWORKS

(75) Inventors: Silke Holtmanns, Klaukkala (FI); Tiina S. Koskinen, Tampere (FI)

(73) Assignee: Nokia Corporation, Espoo (FI)

( * ) Notice: Subject to any disclaimer, the term of this patent is extended or adjusted under 35 U.S.C. 154(b) by 1410 days.

(21) Appl. No.: 11/811,488

(22) Filed: Jun. 11, 2007

(65) Prior Publication Data

US 2008/0307518 A1 Dec. 11, 2008

(51) Int. Cl.
*G06F 7/04* (2006.01)
*H04W 80/10* (2009.01)
*H04L 29/06* (2006.01)

(52) U.S. Cl.
CPC .............. *H04L 63/12* (2013.01); *H04L 63/168* (2013.01); *H04L 65/1016* (2013.01)
USPC ............ 726/3; 726/4; 726/5; 726/6; 380/247; 380/255; 380/278; 380/279; 713/168; 713/169; 713/170; 713/171

(58) Field of Classification Search
None
See application file for complete search history.

(56) References Cited

U.S. PATENT DOCUMENTS

| | | | | |
|---|---|---|---|---|
| 2003/0100308 A1 | 5/2003 | Rusch | | 455/445 |
| 2004/0121760 A1* | 6/2004 | Westman et al. | | 455/411 |
| 2004/0250118 A1 | 12/2004 | Andreev et al. | | 713/201 |
| 2004/0260946 A1 | 12/2004 | Cahill et al. | | 713/201 |
| 2005/0013259 A1 | 1/2005 | Papoushado et al. | | |
| 2006/0258394 A1* | 11/2006 | Dhillon et al. | | 455/552.1 |
| 2007/0204160 A1* | 8/2007 | Chan et al. | | 713/171 |
| 2009/0089435 A1* | 4/2009 | Terrill et al. | | 709/227 |
| 2010/0050234 A1* | 2/2010 | Lindholm et al. | | 726/3 |

FOREIGN PATENT DOCUMENTS

EP 1 858 210 A1 11/2007
WO WO 2004/086789 10/2004

OTHER PUBLICATIONS

3GPP TS 23.228 V7.7.0 (Mar. 2007), 3rd Generation Partnership Project; Technical Specification Group Services and System Aspects; IP Multimedia Subsystems (IMS); Stage 2 (Release 7), pp. 1-223.*
"3GPP TS 33.220 V7.6.0 (Dec. 2006) 3rd Generation Partnership Project; Technical Specification Group Services and System Aspects; Generic Authentication Architecture (GAA); Generic bootstrapping architecture (Release 7)", 3GPP Organizational Partners, Dec. 14, 2006.*
3GPP TS 23.228, V8.0.0 (Mar. 2007), 3$^{rd}$ Generation Partnership Project; Technical Specification Group Services and System Aspects; IP Multimedia Subsystem (IMS); Stage 2 (Release 8), pp. 21-25.
3GPP TS 33.223, V0.3.0 (Feb. 2007), 3$^{rd}$ Generation Partnership Project; Technical Specification Group Services and System Aspects; Generic Authentication Architecture (GAA); Generic Bootstrapping Architecture (GBA) Push Function (Release 7), 16 pgs.

(Continued)

*Primary Examiner* — Alexander Lagor
(74) *Attorney, Agent, or Firm* — Harrington & Smith

(57) ABSTRACT

Disclosed is a method including allowing an application server to request setup of a session on behalf of a user terminal, and using mechanisms of a generic peer authentication procedure for procedure for enabling authentication of the application server to an interrogating server, the interrogating server being a network element that is configured to process said request to setup a session on behalf of a user terminal. Also disclosed are related devices, systems and computer programs.

34 Claims, 4 Drawing Sheets

(56) References Cited

OTHER PUBLICATIONS

3GPP TS 33.220, V7.6.0 (Dec. 2006), 3rd Generation Partnership Project; Technical Specification Group Services and System Aspects; Generic Authentication Architecture (GAA); Generic Bootstrapping Architecture (Release 7), 72 pgs.

3GPP TS 29.109, V7.4.0 (Sep. 2006), 3rd Generation Partnership Project; Technical Specification Group Core Network and Terminals; Generic Authentication Architecture (GAA); Zh and Zn Interfaces based on the Diameter Protocol; Stage 3 (Release 7), 43 pgs.

3GPP TSG SA WG3, (Security) Meeting #45, Oct. 31-Nov. 3, 2006, S3-060738, 1 pg.

3GPP TSG-SA WG3 Meeting #45, Oct. 31-Nov. 3, 2006, Tdoc S3-060775, 1 pg.

3GPP TSG-SA2 Meeting #54, Aug. 28, Sep. 1, 2006, Tdoc S2-063685, 7 pgs.

International Search Report dated Sep. 24, 2008.

\* cited by examiner

SECURITY IN COMMUNICATION NETWORKS

FIELD OF THE INVENTION

The present invention generally relates to security in communication networks and especially, but not exclusively, to security in IP Multimedia Subsystem (IMS) and setting up sessions on behalf of users.

BACKGROUND OF THE INVENTION

Complexity of services offered for users of communication networks grows continuously. Many services are such that the users may not be able to configure all details required for setting up the service, or such that it is not be feasible for the users to do all the configuration. For example a conference call with participants from different countries and timezones may be challenging to setup, especially, if the conference call should be prescheduled.

In order to make things easier and efficient for the users, application servers offering the services may act on behalf of the users. For this reason it has already been defined in 3GPP ($3^{rd}$ Generation Partnership Project) specification TS 23.228 v.8.0.0, section 4.2.4 that a SIP (Session Initiation Protocol) Application Server should be allowed to originate sessions on behalf of a user. Implementation issues relating to such procedure have not been agreed on yet, though.

If the application server is fully trusted (e.g. part of network operator's network and administered by the network operator), it is likely that there are no security issues in allowing session initiation on behalf of users. It is however common that all network elements cannot be assumed to be trustworthy. For example, all network elements are often no longer administered by the network operators themselves (some of them may be outsourced for example), or roaming partners that may not be fully trusted, may be involved. For example premium SMS services suffer from that lack of trust, as it is possible that an untrustworthy roaming partner charges high fees from users home operator, even though the user has not used the service. Some network operators may even completely disable this kind of premium SMS services from roaming users for security and fraud reasons.

If all application servers are not a trusted network elements there may be a risk that allowing application servers to set up sessions on behalf of users can result in fraudulent sessions that are billed to the users. The home operator of a user is then in the difficult situation either to proof that the user has really used the service (which is usually quite difficult) and to take the risk of loosing a customer, or to distrust business partners up to a degree where conducting business is no longer possible. Allowing untrusted application servers to set up sessions on behalf of users may also give opportunity to spoofing and potential DoS (Denial of Service) attacks to application servers or individual network nodes.

I-CSCF (Interrogating Call Session Control Function) is an IMS (IP Multimedia Subsystem) element that provides a contact point within an operator's network. That is, external nodes (nodes that do not belong to operator network) are allowed to contact the I-CSCF. The I-CSCF hides the internal network topology of an operator from the outside. It has been agreed within 3GPP that the I-CSCF will also handle the requests to set up sessions on behalf of users mentioned above.

In current network settings, there are no measures to make sure that a request received at I-CSCF for setting up a session on behalf of a user is not fraudulent.

One solution for this security issue might be to hardcode a list of all trusted applications into the I-CSCF, i.e. to provide a list with authentication information of trustworthy nodes to the I-CSCF. A problem with this kind of hard-coding is that some type of secure authentication mechanism for authenticating the application server is still needed, since the I-CSCF may be contacted from outside the operator network. Also, the list would need to be updated regularly, which requires some sort of update mechanism. Thus, some add-on in addition to the hard-coding is needed. A further problem is that operators tend to outsource their application development to external parties, and therefore the application server may not be trusted. If the application server is not trusted, some mechanism is needed for ensuring that the connection between the application server and the operator is sufficiently secure.

Another solution is to make the I-CSCF prompt the user for authorizing session initiation by a certain application server. A problem with this approach is that the user may be offline and thereby unable to provide a response. This may prevent the use of pre-scheduled applications. Additionally, prompting the user for authorization may not always be very secure solution as many users tend to allow actions without bothering to read what is asked or without understanding the question or the users may just press "yes" because they want to use the service and know that, if they press "no", then they will not get the service.

Thus, further security considerations are needed.

SUMMARY OF THE INVENTION

According to a first aspect of the invention there is provided a method comprising operating in a system allowing an application server to request setup of a session on behalf of a user terminal, and
using mechanisms of a generic peer authentication procedure for enabling authentication of the application server to an interrogating server, the interrogating server being a network element that is configured to process said request to setup a session on behalf of the user terminal.

In this context a session may be for example a conference call, data session, video session or something else.

In an embodiment of the invention, when conducted in the user terminal, the method further comprises
sending to the application server a request to act on behalf of said user terminal in session setup.

In an embodiment of the invention, when conducted in the user terminal, the method further comprises
deriving a token pertaining to the user terminal and the application server, and sending the token to the application server to be used in said authentication.

In an embodiment of the invention, when conducted in the user terminal, the method further comprises
receiving a shared secret secured protected with said token, deriving the shared secret, and
sending information pertaining to the shared secret to the application server to be used in said authentication.

The shared secret may be derived for example by means of decrypting at least ion case the shared secret has been encrypted with the token.

In an embodiment of the invention, when conducted in a bootstrapping server, the method further comprises
deriving a token pertaining to the user terminal and the application server, and sending the token to the interrogating server upon request.

In an embodiment of the invention, when conducted in the bootstrapping server, the method further comprise sending the token to the interrogating server upon receiving an identifier pertaining to said token, to the user terminal and/or to certain authentication procedure.

In an embodiment of the invention, when conducted in the application server, the method further comprises
receiving from the user terminal a token pertaining to the user terminal and the application server,
requesting setup of a session on behalf of the user terminal, and
sending said token to the interrogating server in connection with requesting setup of a session on behalf of the user terminal.

In an embodiment of the invention, when conducted in the application server, the method further comprises
receiving information pertaining to a shared secret from the user terminal, and sending said information pertaining to the shared secret to the interrogating server.

In an embodiment of the invention, when conducted in the application server, the method further comprises
sending, to the interrogating server, an identifier pertaining to said token, to the user terminal and/or to certain authentication procedure in connection with requesting setup of a session on behalf of the user terminal.

In an embodiment of the invention, when conducted in the interrogating server, the method further comprises
receiving a session setup request initiated by the application server on behalf of the user terminal, and
receiving from the application server a first instance of a token pertaining to the user terminal and the application server in connection with said session setup request.

In an embodiment of the invention, when conducted in the interrogating server, the method further comprises
requesting and receiving from a bootstrapping server a second instance of the token pertaining to the user terminal and the application server,
verifying validity of the first instance of the token on the basis of the second instance of the token, and
responsive to the first instance of the token being valid, allowing setup of the requested session.

In an embodiment of the invention, when conducted in the interrogating server, the method further comprises
receiving from the application server an identifier pertaining to pertaining to the first instance of the token, to the user terminal and/or to certain authentication procedure, and
requesting, from the bootstrapping server, the second instance of the token on the basis of said identifier.

In an embodiment of the invention, when conducted in the interrogating server, the method further comprises
storing a shared secret,
sending said shared secret secured with said token to the user terminal,
receiving from the application server information pertaining to the shared secret,
verifying validity of received information pertaining to the shared secret token on the basis of the stored shared secret, and
responsive to the received information pertaining to the shared secret being valid, allowing setup of the requested session.

Above the information pertaining to the shared secret may be for example the shared secret or a hash calculated for the shared secret.

In an embodiment of the invention, the method further comprises
using web service messages in communication between the user terminal and the application server.

According to a second aspect of the invention there is provided a user terminal comprising
a communication unit and a processing unit configured to co-operate with the communication unit, the processing unit being further configured
to employ mechanisms of a generic peer authentication procedure to enable authentication of an application server to an interrogating server, the application server being allowed to request setup of a session on behalf of said user terminal and the interrogating server being a network element that is configured to process said request to setup a session on behalf of said user terminal.

According to a third aspect of the invention there is provided a bootstrapping server comprising
a communication unit and a processing unit configured to co-operate with the communication unit, the processing unit being further configured
employ mechanisms of a generic peer authentication procedure to enable authentication of an application server to an interrogating server, the application server being allowed to request setup of a session on behalf of a user terminal and the interrogating server being a network element that is configured to process said request to setup a session on behalf of said user terminal.

According to a fourth aspect of the invention there is provided an application server comprising
a communication unit and a processing unit configured to co-operate with the communication unit, the processing unit being further configured
to request setup of a session on behalf of a user terminal, and to employ mechanisms of a generic peer authentication procedure to authenticate to an interrogating server, the interrogating server being a network element that is configured to process said request to setup a session on behalf of said user terminal.

According to a fifth aspect of the invention there is provided an interrogating server comprising
a communication unit and a processing unit configured to co-operate with the communication unit, the processing unit being further configured
to receive a session setup request initiated by an application server on behalf of a user terminal, and
to employ mechanisms of a generic peer authentication procedure to authenticate said application server before allowing setup of said requested session.

In an embodiment of the invention the interrogating server is part of a system, which further comprises the application server, the user terminal and a bootstrapping server, which are all configured to employ mechanisms of the generic peer authentication procedure to enable said authentication of said application server to said interrogating server.

According to a sixth aspect of the invention there is provided a computer program embodied in a memory medium comprising computer executable program code arranged to enable an apparatus
to operate in a system allowing an application server to request setup of a session on behalf of a user terminal, and
to use mechanisms of a generic peer authentication procedure for enabling authentication of the application server to an interrogating server, the interrogating server being a network element that is configured to process said request to setup a session on behalf of a user terminal.

According to a seventh aspect of the invention there is provided an apparatus comprising
means for operating in a system allowing an application server to request setup of a session on behalf of a user terminal, and means for using mechanisms of a generic peer authentication procedure for enabling authentication of the application server to an interrogating server, the interrogating server being a network element that is configured to process said request to setup a session on behalf of a user terminal.

Above the term user terminal is used, but logically this may equally mean the user or subscriber using the user terminal. A subscriber may mean one user, that is, the term subscriber may be equal to one or several users. Alternatively a subscription does not need to be bound to a particular user. For example, a company may have a subscription that may be used by more than one user. Specifications generally use the term user, but actually a subscriber is often meant.

A benefit, which may be achieved with some embodiments of the invention, is that for example the usability of complex call-set-ups or some other services may be improved for the user.

Any foregoing memory medium may be a digital data storage such as a data disc or diskette, optical storage, magnetic storage, holographic storage, phase-change storage (PCM) or opto-magnetic storage. The memory medium may be formed into a device without other substantial functions than storage memory or it may be formed as part of a device with other functions, including but not limited to a memory of a computer, a chip set, and a sub assembly of an electronic device.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings in which.

DETAILED SPECIFICATION

Figure 1:
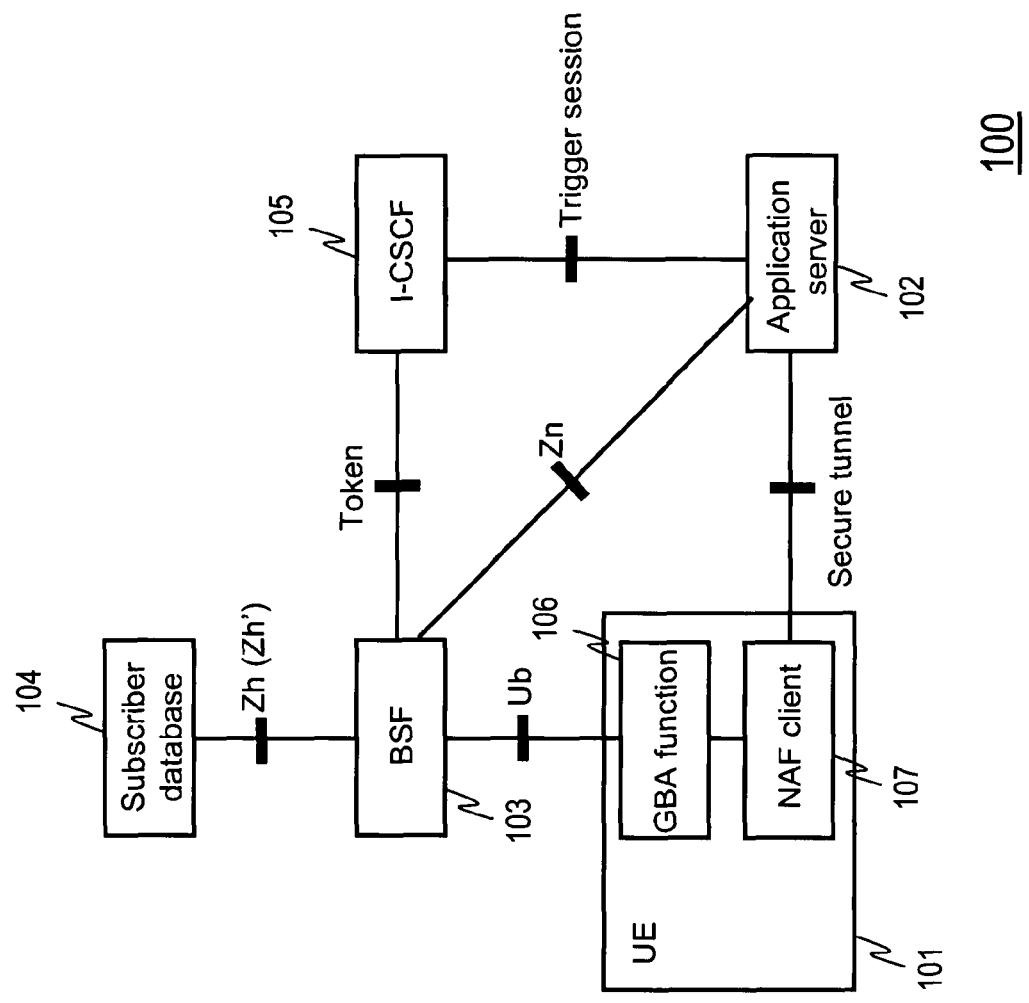
FIG. 1 shows a system according to an embodiment of the invention.

In the following description, like numbers denote like parts.

Various embodiments of the invention employ features of a Generic Authentication Architecture (GAA) and Generic Bootstrapping Architecture (GBA) defined in 3GPP and 3GPP2 for peer authentication and communication security. Variants of GM/GBA are standardized by Open Mobile Alliance (OMA) and CableLabs. GA/GBA is based on mobile algorithms AKA (Authentication and Key Agreement) for 3GPP and CHAP (Challenge Handshake Authentication Protocol) and CAVE (Cellular Authentication and Voice Encryption) for 3GPP2. The bootstrapping procedure of the GA/GBA is specified in 3GPP TS 33.220 v 7.6.0 and TS 29.109 v 7.4.0. The original purpose of the GA/GBA procedures is to authenticate user equipment or a subscriber. Now in various embodiments of the invention, the GAA/GBA is used for authenticating an application server to an interrogating server or the like contact point of communication network.

An advantage that may be achieved by using the authentication mechanisms of GAA/GBA for authenticating application servers is that one may avoid the use of an expensive Public Key Infrastructure that might otherwise be needed. GAA/GBA is a multipurpose enabler that is up-to now used for Mobile TV and for presence. By using this existing mechanism and associated infrastructure one may achieve the benefit that administrative costs and the amount of investment that needs to be made may be reduced.

In the following description terms like user terminal, application server, interrogating server, bootstrapping server, and generic authentication procedure are used for referring to various elements/mechanisms relating to the various embodiments of the invention. It must be noted that in addition to or instead of those explicit elements/mechanisms some other element(s)/mechanism(s) providing comparable functionality may be used.

In various embodiments of the invention an application server that sets up a session on behalf of a user may be for example one of the following:

An application server providing conference (video/data sharing) calls. A call can be scheduled beforehand by a user. Then when the time comes, all participants are invited on behalf of the user.

An application server that sends multimedia greeting cards. A user does not need to send cards out directly when contacting the service, but the server may send them later at a given time.

An application server that manages task reminders from person A to a group. The server may for example send to project members a scheduled SIP-message based reminder to fill in the project-time into some tool or to perform some other task. The person A may define the reminder beforehand.

An application server providing any SIP-based service and allowing a user to pre-schedule at least some tasks.

In an embodiment of the invention it is a web service that the application server provides for the user. Furthermore, web service messages may be used in communication between any communicating parties in various embodiments of the invention.

The application server may be untrusted by the network operator. Additionally the application server (or the application/service residing in the application server) may initiate sessions on behalf of the user for fulfilling tasks defined by the user irrespective of whether the user is or is not reachable at the time the actual task is performed.

FIG. 1 shows a system 100 according to an embodiment of the invention. The system comprises a user equipment (UE) 101, such as a mobile phone, and an application server 102 providing IMS service(s). Additionally the system comprises a bootstrapping server function (BSF) 103, a subscriber database 104, such as a home subscriber server (HSS) or home location register (HLR), and an I-CSCF element 105 that is contactable from the application server. In this context the I-CSCF represents the first node that an external entity is to contact to set up a session on behalf of a user. The UE comprises a GBA function block 106 configured to co-operate with the BSF and a NAF (network application function) client 107 configured to co-operate with the application server. (In GAA/GBA an application server may be referred to as NAF.) There is a Zh interface defined in GAA/GBA between the BSF and the subscriber database, a Zn interface between the BSF and the application server, and Ub interface between the BSF and the UE. Additionally, there may be a Zh' interface between the BSF and HLR, if a HLR is deployed. Additionally, there may be an interface to a subscription locator function (SLF) that provides subscriber database information to the BSF.

The application server 105 may be administered by a different party compared to the BSF 103 and subscriber database 104, or they may be administered by the same party (which is typically the operator of the communication network in question).

It must be noted that the system 100 may, and usually does, comprise various other elements as well, but they are not shown here for the sake of clarity.

An example of the operation of the system 100 is discussed below in connection with FIG. 2, which shows a messaging diagram according to an embodiment of the invention.

In phase 2-1 a token is derived in the UE 101. The GBA function 106 generates key material pertaining to the application server (AS) 102. This key material may be derived by means of KDF (key derivation function) defined in GAA/GBA, and the key material may be for example Ks_NAF (key material for specific NAF) defined in GAA/GBA as Ks_NAF=KDF (Ks (key material), "gba-me", RAND (random challenge in authentication), IMPI (IMS private identity), NAF_Id (Id of the application server)). Usually KDF is SHA-1 (secure hash algorithm #1). The first token can be derived as follows: first token=KDF (Ks_NAF, CK (confidential key), IK (integrity key)). In addition to or instead of Ks_NAF, CK and IK the token generation function may take into account some other data. For example passwords may be taken into account. Passwords may be used instead of CK and/or IK or in addition to one or both of them. The UE possess also an identifier that is used as an identifier for a specific authentication procedure. The identifier may be for example B-TID (bootstrapping transaction identifier), IMPI or application server identifier, but also some other identifier may be suitable for this purpose.

Then the UE contacts the application server (AS) and sets up a secure tunnel 2-2 using the key material pertaining to the AS (e.g. Ks_NAF or Ks_(ext/int)_NAF or some other key material). The AS uses the Zn interface to obtain the key material 2-3 from the BSF. The BSF also derives in phase 2-4 the same token the UE generated in phase 2-1. The UE sends a service request, the token, and an identifier 2-5 over the secure channel. The service request is such that the AS is requested to act on behalf of the UE (or the user of the UE). The service is such that it can be executed immediately or later on.

After this some time may go by before the AS actually starts initiating a session on behalf of the UE. (This is not mandatory, though.) For initiating the session the AS sends to the I-CSCF a trigger message, the token and the identifier 2-6. The trigger message may be secured with the token (e.g. encrypted with the token). The trigger message comprises data needed for initiating the session. A person skilled in the art is aware of the details of such data and herein they are not discussed any further.

Responsive to receiving the trigger message the I-CSCF sends the identifier 2-7 to the BSF. The BSF notes that the identifier 2-7 (or a request comprising the identifier) comes from the I-CSCF and fetches the token pertaining to the identifier (the token derived in phase 2-4) and returns the token 2-9 to the I-CSCF. There may be a new interface in the BSF for enabling this kind of fetching of a token or the existing Zn interface may be extended for this purpose.

In phase 2-10 the I-CSCF then verifies that the token received from the BSF is valid. If it is valid, the service request on behalf of the user is allowed to proceed. The verification of the token may be conducted for example by comparing the token received from the BSF and the token received from the AS to find out if they match. If they do match, the token received from the BSF is valid. In practise the comparison may be conducted by trying whether the token received from the BSF opens up the trigger message sent by the AS and secured with the token (at least in case encryption and decryption work the same way). Also other ways of verifying validity of the token may be used.

Figure 3:
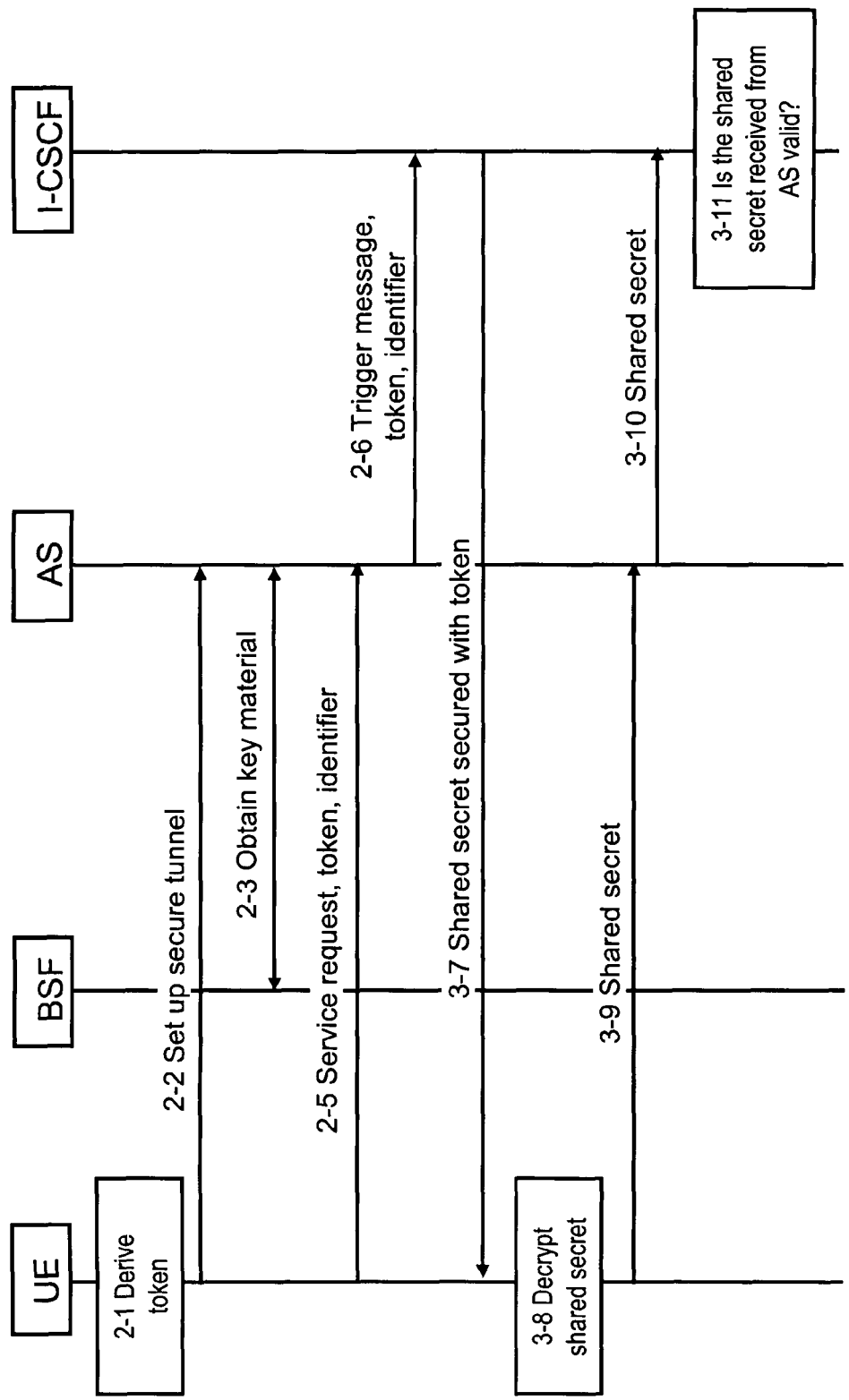
FIG. 3 shows a messaging diagram according to another embodiment of the invention.

FIG. 3 shows a messaging diagram according to another embodiment of the invention. This embodiment concerns an alternative where a fixed secret is stored in the I-CSCF and the fixed secret is sent to the UE in case an AS is trying to open up a connection on behalf of the UE.

Figure 2:
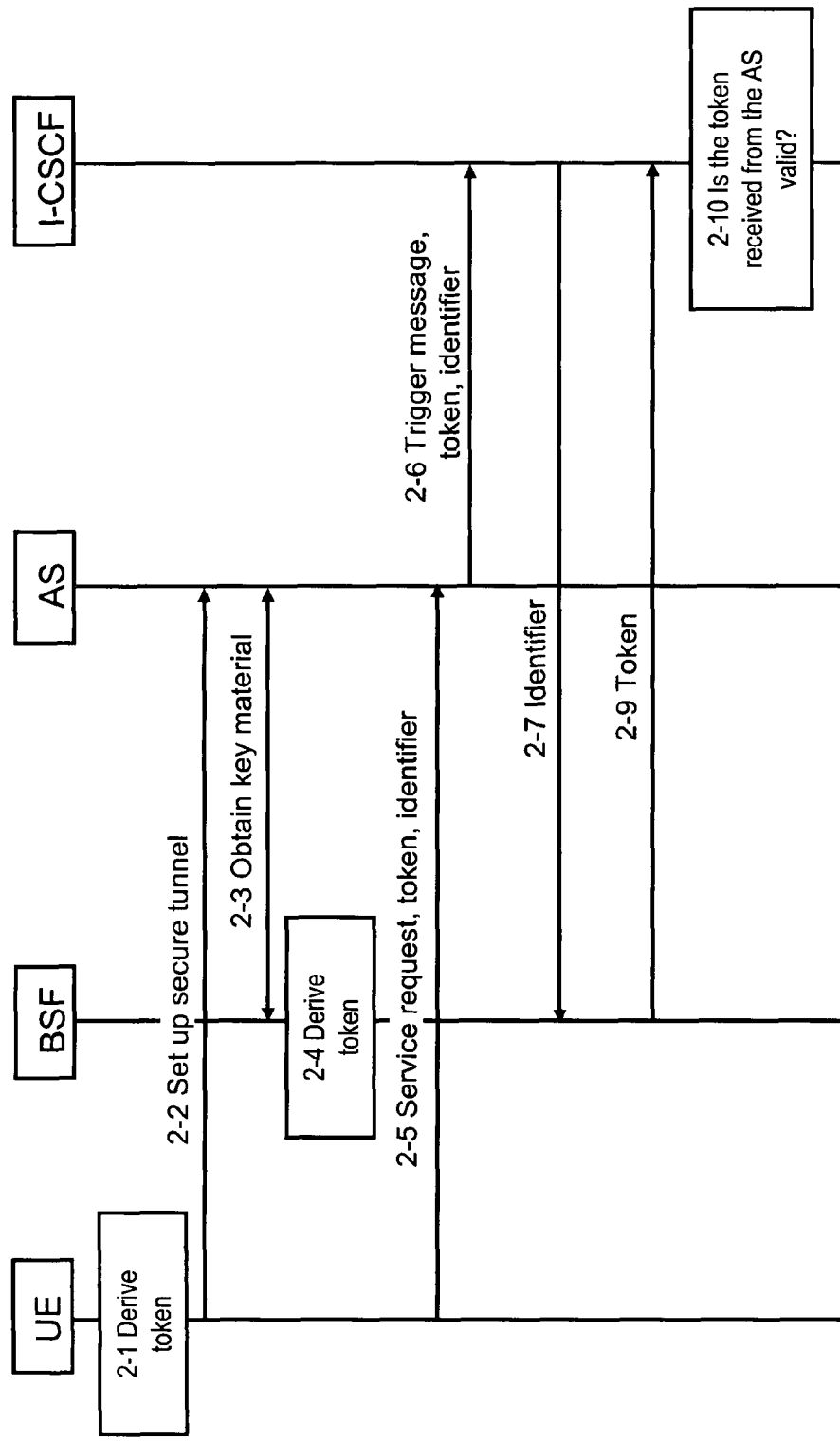
FIG. 2 shows a messaging diagram according to an embodiment of the invention.

Phases and messages 2-1, 2-2, 2-3, 2-5 and 2-6 are identical to those of FIG. 2 and therefore their description is not repeated herein. There is no need to derive the token in BSF, though.

Like mentioned above the I-CSCF now possesses a shared secret and responsive to receiving the trigger message the I-CSCF sends the shared secret 3-7 to the UE. The shared secret is secured (e.g. encrypted) with the token. The UE decrypts the shared secret in phase 3-8 and sends the shared secret 3-9 to the AS. The AS then forwards the shared secret 3-10 to the I-CSCF. Instead of the shared secret the UE may send a hash calculated for the shared secret and the token.

In phase 3-11 the I-CSCF then verifies that the shared secret received from the AS is valid. If it is valid, the service request on behalf of the user is allowed to proceed. The verification of the shared secret may be conducted for example by comparing the shared secret received from the AS and the shared secret sent to the UE to find out if they match. In case a hash of the shared secret and the token is received the I-CSCF calculates corresponding hash for the shared secret that was sent to the UE and then verifies validity of the received hash. It is naturally possible that such hash is calculated and stored in advance.

In yet another embodiment of the invention GBA Push procedure defined in 3GPP TS 33.223 v.0.3.0 may be used for generating the key material in the UE. This may suit for example situations where an AS starts to initiate a session on behalf of a user even though the user has not pre-scheduled a service in the AS.

Figure 4:
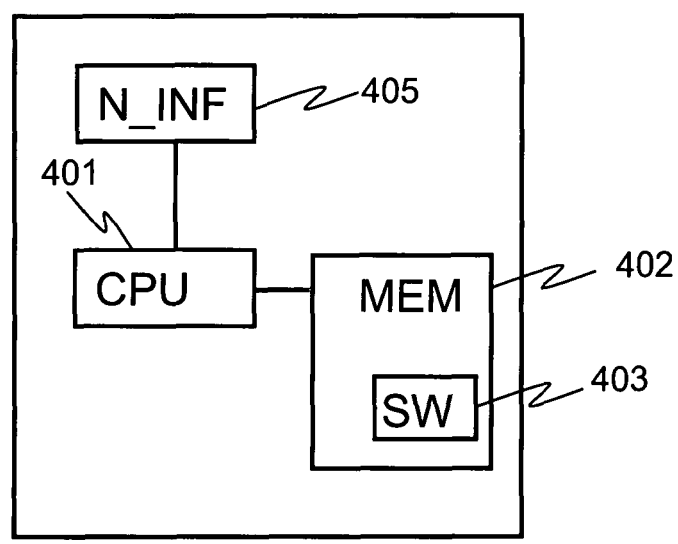
FIG. 4 shows a block diagram of an apparatus suited for implementing various embodiments of the invention.

FIG. 4 shows a block diagram of an apparatus 400 suited for implementing various embodiments of the invention. The apparatus 400 may be a typical computer, such as, a general-purpose computer or a server, with possibly distributed functions. In some other embodiments the apparatus may be a wireless communication device such as mobile phone.

The apparatus comprises a processing unit 401 for controlling the apparatus and a memory 402 including a computer program code or software 403. The processing unit may be for example a central processing unit (CPU), a general-purpose processor, a microprocessor, a digital signal processor, an application specific integrated circuit, a field programmable gate array, a microcontroller or a combination of such elements.

The software 403 includes instructions for the CPU 401 to control the apparatus 400 such as an operating system and different computer applications. The software 403 may comprise instructions for controlling the apparatus to provide some functionality of the invention. The instructions may for example control the apparatus to operate as an application server, an interrogating server, a bootstrapping server, or a user terminal (or user equipment) according to some embodiments of the invention. The instructions may also control the same apparatus to operate as more than one of the foregoing elements according to some embodiments of the invention. That is, the elements of the invention need not be physically separate elements but they may be also logically different elements running on the same physical hardware.

The apparatus 400 further comprises a network interface (N_INF) unit 405 The network interface unit may be for example a LAN (Local Area Network) unit or an Ethernet unit, or a radio interface such as a WLAN (Wireless LAN) or a cellular network interface. The apparatus 400 could comprise also a user interface (not shown), such as a display and a keyboard, but the user interface may be implemented also by means of a remote connection through the network interface.

It should be appreciated that in this document, words comprise, include and contain are each used as open-ended expressions with no intended exclusivity.

Particular implementations and embodiments of the invention have been described by way of non-limiting examples relating to GBA and specific use cases. It is clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising:
   receiving a session setup request initiated by an application server on behalf of a user terminal;
   providing information from the user terminal to an interrogation server via the application server in connection with said session setup request, the information comprising a first instance of a token derived by the user terminal and pertaining to the user terminal and the application server, and a shared secret specified for the user terminal, wherein the information from the user terminal to the interrogation server via the application server comprises an identifier specified for the authentication where the identifier is associated with a second instance of the token at a bootstrapping server;
   requesting and receiving from the bootstrapping server the second instance of the token pertaining to the user terminal and the application server on a basis of said identifier,
   verifying validity of the first instance of the token derived by the user terminal on the basis of the second instance of the token received by the bootstrapping server;
   responsive to the first instance of the token derived by the user terminal being valid, using at least the first instance of the token derived by the user terminal, implementing mechanisms of a generic peer authentication procedure and enabling authentication of the application server to the interrogating server, wherein the authentication comprises comparing a shared secret as provided to the user terminal to the shared secret specified for the user terminal provided in the information via the application server for the authentication; and
   based on the authentication, setting up a session with the application server on behalf of the user terminal, the authentication based at least in part on said information being valid.

2. The method according to claim 1, when conducted in the user terminal, the method further comprising
   sending to the application server a request to act on behalf of said user terminal in session setup.

3. The method according to claim 1, when conducted in the user terminal, the method further comprising:
   deriving the first instance of the token pertaining to the user terminal and the application server, and
   sending the first instance of the token to the application server to be used in said authentication.

4. The method according to claim 3, when conducted in the user terminal, the method further comprising
   receiving a shared secret secured with said first instance of the token,
   deriving the shared secret, and
   sending information pertaining to the shared secret to the application server to be provided in said information to the interrogating server.

5. The method according to claim 4, wherein the information pertaining to the shared secret is one of the shared secret or a hash calculated for the shared secret.

6. The method according to claim 1, when conducted in said bootstrapping server, the method further comprising
   deriving a third instance of the token as the first instance of the token derived by the user terminal and pertaining to the user terminal and the application server, and
   sending the third instance of the token to the interrogating server upon request, wherein the authenticating comprises determining that the token derived by the user terminal and the same token derived by the bootstrapping server match.

7. The method according to claim 6, when conducted in the bootstrapping server, the method further comprising
   sending the third instance of the token to the interrogating server upon receiving an said identifier pertaining to at least one of said first instance of the token derived by the user terminal and a certain authentication procedure.

8. The method according to claim 1, when conducted in the application server, the method further comprising
   requesting setup of said session on behalf of the user terminal, and
   sending said first instance of the token to the interrogating server in connection with requesting setup of the session on behalf of the user terminal.

9. The method according to claim 8, when conducted in the application server, the method further comprising
   receiving information pertaining to the shared secret from the user terminal, and
   sending said information pertaining to the shared secret in said information to the interrogating server to be used in said authentication, wherein the shared secret is one of the shared secret or a hash calculated for the shared secret.

10. The method according to claim 1, wherein a shared secret is secured at the interrogating server with the first instance of the token and returned to the user terminal to be decrypted by the user terminal and then returned to the application server for the authentication of the application server to the interrogating server.

11. The method according to claim 1, when conducted in the interrogating server, the method further comprising
    storing the shared secret,
    sending said shared secret secured with said first instance of the token to the user terminal,
    receiving from the application server said information pertaining to the shared secret,
    verifying validity of the information on the basis of the stored shared secret, and
    responsive to the received information pertaining to the shared secret being valid, allowing setup of the requested session.

12. The method according to claim 11, wherein the received information pertaining to the shared secret is one of the shared secret or a hash calculated for the shared secret.

13. The method according to claim 1, further comprising using web service messages in communication between the user terminal and the application server.

14. A user terminal comprising:
at least one processor; and
at least one memory including computer program code, where the at least one memory and the computer program code are configured with the at least one processor to cause the user terminal to at least:
employ mechanisms of a generic peer authentication procedure to enable authentication of an application server to an interrogating server,
providing to the interrogating server in connection with a session setup request, via the application server, information comprising a first instance of the token derived by the user terminal and pertaining to the user terminal and the application server, and a shared secret specified for the user terminal, wherein the authentication comprises comparing a shared secret as provided to the user terminal to the shared secret specified for the user terminal provided in the information via the application server for the authentication, and wherein the information for the user terminal comprises an identifier specified for the authentication, and wherein the identifier is associated with a second instance of the token at a bootstrapping server,
wherein said session setup request is initiated by the application server on behalf of the user terminal based on the identifier, wherein said second instance of the token obtained from the bootstrapping server is used by the interrogating server to verify validity of the first instance of the token derived by the user terminal, and
responsive to the first instance of the token derived by the user terminal being valid, using at least the token derived by the user terminal implementing mechanisms of a generic peer authentication procedure and enabling authentication via the application server to the interrogating server enabling the application server to setup a session on behalf of said user terminal and the interrogating server, wherein the interrogating server comprises a network element that is operative to process said request to setup the session on behalf of said user terminal, the authentication based at least in part on said information being valid.

15. The user terminal according to claim 14, wherein the at least one memory including the computer program code is further configured with the at least one processor to cause the user terminal to send to the application server a request to act on behalf of said user terminal in the session setup.

16. The user terminal according to claim 14, wherein the at least one memory including the computer program code is further configured with the at least one processor to cause the user terminal to:
derive the first instance of the token pertaining to the user terminal and the application server, and
send the first instance of the token to the application server via a secure tunnel between the user terminal and the application server to be used in said authentication.

17. The user terminal according to claim 16, wherein the at least one memory including the computer program code is further configured with the at least one processor to cause the user terminal to:
receive a shared secret secured with said first instance of the token,
derive the shared secret, and
send information pertaining to the shared secret to the application server via the secure tunnel to be used in said authentication.

18. The user terminal according to claim 17, wherein the information pertaining to the shared secret is one of the shared secret or a hash calculated for the shared secret.

19. A bootstrapping server comprising:
at least one processor; and
at least one memory including computer program code, where the at least one memory and the computer program code are configured with the at least one processor to cause the bootstrapping server to at least:
receive, from an interrogating server, a request for information to use invalidating information received via an application server comprising a first instance of the token derived by a user terminal and pertaining to the user terminal and the application server at the interrogating server and a shared secret specified for the user terminal, wherein the information pertaining to the user terminal comprises an identifier specified for the authentication, and wherein the identifier is associated with a second instance of the token at the bootstrapping server and the second instance of the token is verified with the first instance of the token derived by the user terminal and provided in the information,
receiving a session setup request initiated by the application server on behalf of the user terminal,
receiving from the application server said information comprising the first instance of the token derived by the user terminal and the application server in connection with said session setup request,
providing said second instance of a token pertaining to the user terminal and the application server, wherein the second instance is used to verify validity of first instance of the token derived by the user terminal,
responsive to the first instance of the token derived by the user terminal being valid, authenticate, using mechanisms of a generic peer authentication procedure the application server to an interrogating server, the application server being allowed to request setup of a session on behalf of the user terminal, wherein the authentication comprises comparing the first instance of the token derived by the user terminal to the second instance of the token pertaining to the user terminal provided in the information via the application server for the authentication, and
based on the authenticating, setting up said session with the application server on behalf of said user terminal, the setting up based at least in part on the information comprising the first instance of the token derived by the user terminal and pertaining to the user terminal and the application server being valid.

20. The bootstrapping server according to claim 19, wherein the at least one memory including the computer program code is further configured with the at least one processor to cause the bootstrapping server to:
in response to the request, derive a third instance of the token as the first instance of the token derived by the user terminal and pertaining to the user terminal and the application server, and
send the third instance of the token to the interrogating server, the third instance of the token for use in validating said information pertaining to the user terminal and the application server, wherein the authenticating comprises determining that the first instance of the token derived by the user terminal and the third instance of the token derived by the bootstrapping server match.

21. The bootstrapping server according to claim 20, wherein the request for the information comprises said identifier pertaining to at least one of said first instance of the token, the user terminal and a certain authentication procedure.

22. An application server comprising:
at least one processor; and
at least one memory including computer program code, where the at least one memory and the computer program code are configured with the at least one processor to cause the application server to at least:
request setup of a session on behalf of a user terminal comprising providing by the application server information received from the user terminal via a secure tunnel between the application server and the user terminal to an interrogation server, the information comprising a first instance of a token derived by the user terminal and pertaining to both the user terminal and the application server, and a shared secret specified for the user terminal,
using the information, trigger a generic peer authentication procedure to authenticate to an interrogating server, the interrogating server being a network element that is operative to process said request to setup said session on behalf of said user terminal, wherein the authentication comprises comparing a second instance of the token as provided to the user terminal to the first instance of the token derived by the user terminal provided in the information via the application server for the authentication, wherein the information pertaining to the user terminal comprises an identifier specified for the authentication, and wherein the identifier is associated with the second instance of the token at a bootstrapping server and the second instance of the token is verified with the first instance of the token derived by the user terminal and provided in the information,
providing to the bootstrapping server the identifier specified for the authentication pertaining to the user terminal and a certain authentication procedure,
receiving from the bootstrapping server a second instance of the token pertaining to the user terminal and the application server,
verifying validity of the first instance of the token derived by the user terminal on the basis of the second instance of the token;
based on the first instance of the token derived by the user terminal being valid, providing the authentication, setting up said session on behalf of the user terminal with the interrogating server.

23. The application server according to claim 22, wherein the at least one memory including the computer program code is further configured with the at least one processor to cause the application server to:
receive from the user terminal via a secure tunnel between the application server and the user terminal the first instance of the token derived by the user terminal and pertaining to the user terminal and the application server, and
send said first instance of the token to the interrogating server in connection with requesting setup of a session on behalf of the user terminal.

24. The application server according to claim 23, wherein the at least one memory including the computer program code is further configured with the at least one processor to cause the application server to:
receive information pertaining to the shared secret from the user terminal via the secure tunnel, and
send said information pertaining to the shared secret to the interrogating server.

25. The application server according to claim 24, wherein the information pertaining to the shared secret is one of the shared secret or a hash calculated for the shared secret.

26. The application server according to claim 23, wherein the at least one memory including the computer program code is further configured with the at least one processor to cause the application server to:
send, to the interrogating server, said identifier pertaining to said first instance of the token, to at least one of the user terminal and to a certain authentication procedure in connection with requesting setup of said session on behalf of the user terminal.

27. An interrogating server comprising:
at least one processor; and
at least one memory including computer program code, where the at least one memory and the computer program code are configured with the at least one processor to cause the interrogating server to at least:
receive a session setup request initiated by an application server on behalf of a user terminal;
receive, from the user terminal via the application server, information comprising a first instance of a token derived by the user terminal and pertaining to both the user terminal and the application server, and a shared secret specified for the user terminal, wherein the information pertaining to the user terminal comprises an identifier specified for the authentication, and wherein the identifier is associated with a second instance of the token at a bootstrapping server and the second instance of the token is verified with the first instance of the token derived by the user terminal and provided in the information;
requesting and receiving from the bootstrapping server the second instance of the token pertaining to the user terminal and the application server,
verifying validity of the first instance of the token on the basis of the second instance of the token;
responsive to the first instance of the token being valid, using at least the first instance of the token derived by the user terminal, employ mechanisms of a generic peer authentication procedure to authenticate said application server, wherein the authentication comprises comparing a shared secret as provided to the user terminal to the shared secret specified for the user terminal provided in the information via the application server for the authentication, and
setting up said requested session, where the authentication is based at least in part on said information being valid.

28. The interrogating server according to claim 27, wherein the
information received from the user terminal via the application server comprises said first instance of the first instance of the token pertaining to the user terminal and the application server in connection with said session setup request.

29. The interrogating server according to claim 28, wherein the at least one memory including the computer program code is further configured with the at least one processor to cause the interrogating server to:
request and receive from the bootstrapping server said second instance of the first instance of the token pertaining to the user terminal and the application server, verify validity of the first instance of the token on the basis of the second instance of the token, and responsive to the first instance of the token being valid, allow setup of the requested session.

30. The interrogating server according to claim 29, wherein the at least one memory including the computer program code is further configured with the at least one processor to cause the interrogating server to:

receive from the application server an said identifier pertaining to at least one of the first instance of the token, the user terminal and a certain authentication procedure, and request, from the bootstrapping server, the second instance of the token on the basis of said identifier.

31. The interrogating server according to claim 28, further comprising a storage storing a shared secret, wherein at least one memory including the computer program code is further configured with the at least one processor to cause the interrogating server to:

send said shared secret secured with said first instance of the token to the user terminal, receive from the user terminal via the application server information pertaining to the shared secret, verify validity of the received information pertaining to the shared secret secured with said first instance of the token on the basis of the stored shared secret, and responsive to the received information pertaining to the shared secret being valid, allow setup of the requested session.

32. The interrogating server according to claim 31, wherein the received information pertaining to the shared secret is one of the shared secret or a hash calculated for the shared secret.

33. The interrogating server according to claim 27, wherein the interrogating server is part of a system, which further comprises said application server, said user terminal and said bootstrapping server, which application server, user terminal and bootstrapping server are all operative to employ mechanisms of the generic peer authentication procedure to enable said authentication of said application server to said interrogating server.

34. A non-transitory computer-readable medium embodying a computer program comprising computer executable program code operative to cause an apparatus to:

operate in a system allowing an application server to request setup of a session on behalf of a user terminal, providing, by the user terminal via the application server, information comprising a first instance of a token derived by the user terminal and pertaining to the user terminal and the application server, and a shared secret specified for the user terminal, wherein the information from the user terminal to an interrogation server via the application server comprises an identifier specified for the authentication where the identifier is associated with a second instance token at a bootstrapping server, wherein a session setup request is initiated by the application server on behalf of the user terminal based on the identifier, wherein said second instance of the token obtained from the bootstrapping server is used by the interrogating server to verify validity of the first instance of the token pertaining to the user terminal, and responsive to the first instance of the token pertaining to the user terminal being valid, using at least the first instance of the first instance of the token pertaining to the user terminal using mechanisms of a generic peer authentication procedure authenticating the application server to an interrogating server, where the authentication is based at least in part on said information being valid, wherein the authentication comprises comparing a shared secret as provided to the user terminal to the shared secret specified for the user terminal provided in the information via the application server for the authentication, and based on the authenticating setting up said session on behalf of a user terminal.

* * * * *

UNITED STATES PATENT AND TRADEMARK OFFICE
CERTIFICATE OF CORRECTION

PATENT NO. : 8,875,236 B2  
APPLICATION NO. : 11/811488  
DATED : October 28, 2014  
INVENTOR(S) : Holtmanns et al.

Page 1 of 1

It is certified that error appears in the above-identified patent and that said Letters Patent is hereby corrected as shown below:

In the Claims

Claim 7, col. 10, line 31 "an" should be deleted in between "receiving" and "said".

Claim 30, col. 15, line 9 "an" should be deleted in between "server" and "said".

Signed and Sealed this  
Third Day of March, 2015

Michelle K. Lee  
*Deputy Director of the United States Patent and Trademark Office*